United States Patent [19]

Stuemky et al.

[11] 4,305,608
[45] Dec. 15, 1981

[54] FERRULE, COUPLING AND PROCESS

[75] Inventors: Robert E. Stuemky, Elizabeth; David E. Jewell, Littleton, both of Colo.

[73] Assignee: The Gates Rubber Company, Denver, Colo.

[21] Appl. No.: 57,542

[22] Filed: Jul. 13, 1979

[51] Int. Cl.³ .................... F16L 33/20; B23P 17/00
[52] U.S. Cl. .................... 285/256; 285/259; 29/417; 29/455 R; 29/508; 29/516
[58] Field of Search .................... 285/256, 254, 382.7, 285/DIG. 7, 149, 29/508, 516, 417, 455 R

[56] References Cited

U.S. PATENT DOCUMENTS

| 654,040 | 7/1900 | Wilkins | 285/259 |
|---|---|---|---|
| 1,006,671 | 10/1911 | Myer | 285/259 X |
| 2,091,852 | 8/1937 | Hinds | 285/259 X |
| 2,147,356 | 2/1939 | Scholtes | 285/259 X |
| 2,211,147 | 8/1940 | Miller | 285/259 X |
| 2,367,447 | 1/1945 | Strout | 285/259 X |
| 2,452,728 | 11/1948 | Carling | 285/256 X |
| 2,453,997 | 11/1948 | MacWilliam | 285/259 X |
| 2,481,001 | 9/1949 | Burckle | 285/149 |
| 2,626,167 | 1/1953 | Lake | 285/256 X |
| 4,064,614 | 12/1977 | Horvath | 285/256 X |

FOREIGN PATENT DOCUMENTS

| 715932 | 8/1965 | Canada | 285/256 |
|---|---|---|---|
| 1450423 | 3/1969 | Fed. Rep. of Germany | 285/256 |
| 594546 | 11/1947 | United Kingdom | 285/256 |
| 1528530 | 11/1978 | United Kingdom | 285/256 |

*Primary Examiner*—Dave W. Arola
*Attorney, Agent, or Firm*—H. W. Oberg, Jr.; Raymond Fink; Curtis H. Castleman, Jr.

[57] ABSTRACT

A ferrule for use with a male stem which together define a coupling for flexible hose, the ferrule including a sleeve having an inside surface from which extend a plurality of longitudinally oriented ribs that are circumferentially spaced from each other. The ferrule is preferably made by extruding a metal tube and forming a plurality of longitudinal ribs, circumferentially spaced from each other along the tube inside surface; and cutting the tube in desired lengths to define ferrules.

8 Claims, 9 Drawing Figures

U.S. Patent  Dec. 15, 1981  4,305,608
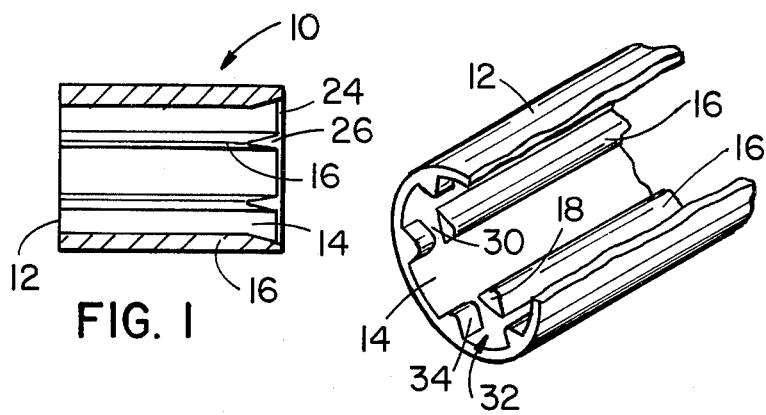
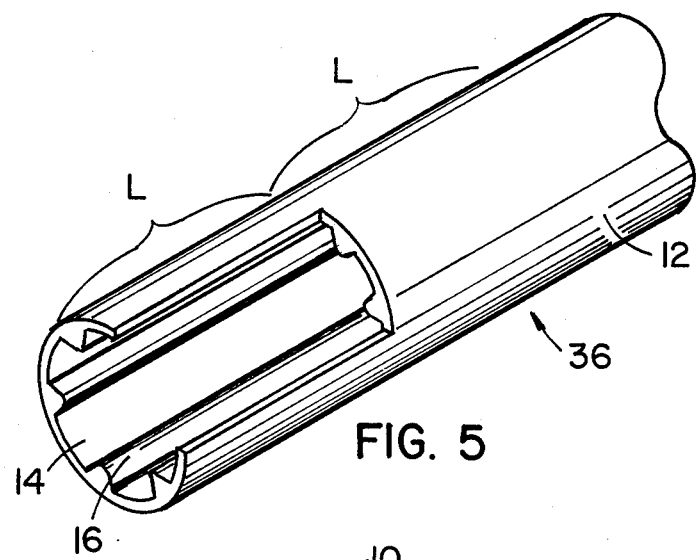
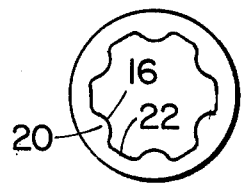
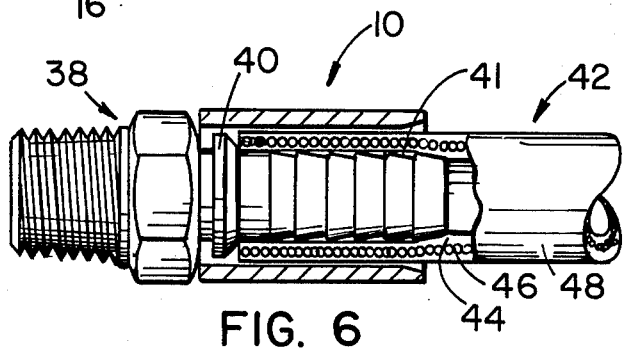
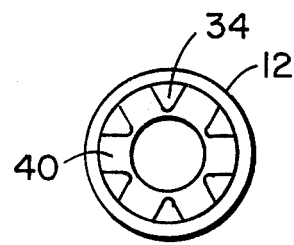
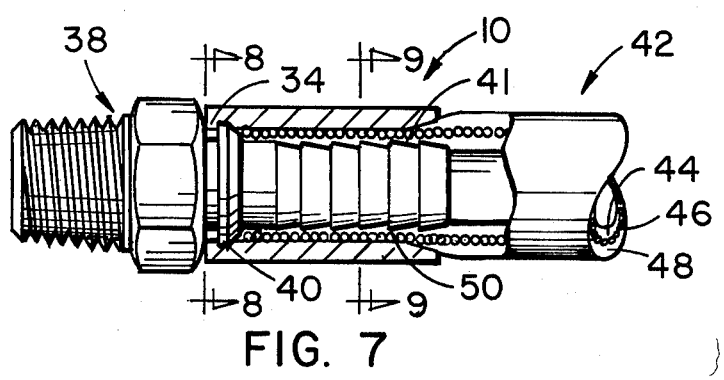
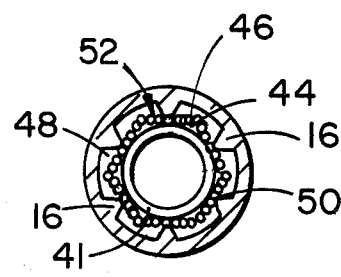

FERRULE, COUPLING AND PROCESS

BACKGROUND OF THE INVENTION

The invention relates to attachable couplings of the male stem—ferrule type for use with reinforced, flexible hose, but more particularly, the invention relates to a ferrule with longitudinal ribs formed on its inside surface.

Couplings post assembled to a finished hose product typically have a male stem portion that is insertable into a hose end and a ferrule that is concentric with the male stem. Together, the male stem and ferrule define an annular cavity for receiving a hose end. The coupling is retained by pinching the hose end between the ferrule and stem. This is accomplished by either the effects of radially reducing the size of the ferrule or a radial increase in the male stem.

Sealing and retaining a coupling to a high pressure hose subjected to impulses may be accomplished by using a serrated stem with a ferrule locking collar. The ferrule may be pre-attached such as by crimping an end portion to the collar so that the annular hose receiving cavity is formed or a separate ferrule with an internal collar may be provided to attach behind the stem collar when the ferrule is crimped.

Circumferential or helical ribs or threads are oftentimes provided on the inside of the ferrule to cause undulations in or to make surface contact with a twined hose reinforcement in conjunction with a serrated stem.

The ferrule locking collar, serrated stem, and ferrule with either helical or annular ribs represent techniques used to withstand high end forces while simultaneously providing a coupling hose seal. For example, a coupling for use with a one-half inch (I.D.) hose having an 8,000 psi burst pressure must withstand end forces of approximately ¾ ton without leaking. Some ferrules using helical or circumferential ribs require the cover to be skived from the hose so the ribs can make direct surface contact with a reinforcement such as braided wire. Other ferrules have sharp annular or helical ribs which cut through the cover and make surface contact with the reinforcement during a crimping operation. In either case, the ferrules are sometimes difficult to install over a flared reinforcement at the hose end when annular or helical ribs of the ferrule circumferentially engage the reinforcement. Also, such ferrules are oftentimes expensive because the ferrule must be turned from bar stock to the desired configuration.

The ferrule of the invention is intended for use with the various types of couplings and the process for making the ferrule eliminates several machining operations.

SUMMARY OF THE INVENTION

In accordance with the invention, a ferrule for use with a hose coupling is provided as a sleeve with a plurality of longitudinal ribs extending from its inside surface. The ribs are circumferentially spaced from each other. In use, the ferrule is arranged coaxially with a male stem. The ferrule and stem define an annular cavity for receiving a hose end. A plurality of teeth are formed at one end of the sleeve from the ribs to define a serrated collar that attaches behind a collar of the stem to secure the ferrule (such as when crimping the ferrule).

The ferrule may be made by extruding a tube and forming a plurality of longitudinal ribs along its inside surface. Ferrules of desired length are cut from the tube. Optionally, one end of the ferrule may be internally chamfered.

The longitudinally oriented ribs of the ferrule pinch the hose in cooperation with the male stem and provide a hydraulic seal. Unexpectedly, the longitudinal ribs of the ferrule of the invention do not provide a leakage path for hose effluent. The ribs provide sufficient surface contact with the hose reinforcement for coupling retention and the ferrule makes sufficient pressure contact with the stem to provide the necessary sealing capability.

An object of the invention is to provide a hose ferrule which does not require extensive machining operations but yet exhibits comparable hydraulic performance to an extensively machined ferrule when subjected to rigorous pressure cycling such as exemplified by SAE 100R1 hose standards.

These and other objects or advantages of the invention will be apparent after reviewing the drawings and description thereof wherein:

FIG. 1 is a longitudinal cross section of a ferrule made in accordance with the invention;

FIG. 2 is a partial isometric cutaway view showing the end portion of ferrule of FIG. 1;

FIG. 3 is a view similar to that of FIG. 2 showing an alternative embodiment of the invention;

FIG. 4 is an axial cross-sectional view showing an alternate form of the ribs and inside wall of the invention;

FIG. 5 is a partially cutaway isometric view showing a length of tubing from which several ferrules may be cut;

FIG. 6 is a partially cutaway and sectional side view of a coupled hose assembly prior to ferrule crimping;

FIG. 7 is a view similar to that of FIG. 6 showing the effects of ferrule crimping;

FIG. 8 is a view taken along the line 8—8 of FIG. 7; and

FIG. 9 is a sectional view taken along the line 9—9 of FIG. 7.

DESCRIPTION OF PREFERRED EMBODIMENTS

Referring to FIGS. 1 and 2, the ferrule 10 of the invention includes a sleeve 12 having an inside surface 14 from which project a plurality of longitudinal ribs 16. The ribs may either be circumferentially asymmetrically spaced, or more preferably, the ribs are circumferentially symmetrically spaced. The ribs are substantially straight and generally axially oriented with the sleeve axis. The substantially straight ribs extend longitudinally preferably a major length of the sleeve.

The cross section of the rib and inside surface of the sleeve are chosen to be compatible with the hose to be coupled. The ribs may have a generally triangular cross section 18 and form an apex which may be used to bite through the cover of a hose to make surface contact with an embedded reinforcement as will later be explanied. For some types of hoses, for example plastic hose, it is desirable for the ribs not to penetrate the cover. In this situation, ribs having a sector cross section 20 such as exemplified by FIG. 4 may be used. The sleeve may have any desired inside surface shape. For example, the inside surface may be generally chordal 22 between the ribs such as shown in FIG. 4 or it may be substantially cylindrical such as shown in all other Figures.

In some coupling applications, it is desirable that at least one end of the sleeve has an internal chamfer 24 which forms a stress relief for a coupled hose. Additionally, the internal chamber of the sleeve may be extended to bevel 26 the end portions of the ribs. Various combinations of chamfering and beveling may be used with chamfering to obtain a desired stress relieve such as shown for example in FIG. 3.

The other end of the sleeve may be used to define means for attaching the sleeve to a locking collar of a hose stem. For example, an internal collar 28 may be formed on the sleeve (FIG. 3). Optionally, a transverse groove 30 may be formed in the end portions of the ribs as shown in FIG. 2 to define a serrated collar 32 for attaching to the locking collar of a stem. The so-formed groove then defines a plurality of teeth 34 that may engage the locking collar. The teeth may be formed by machining, but more preferably, the teeth are formed during a crimping operation as will later be explained.

The ferrules of FIGS. 1–4 may be formed by any of the known ferrule producing techniques such as by machining, broaching, cold forming or turning. However, the economical advantages of the invention are most significantly realized when the sleeves and ribs are simultaneously extruded.

Referring to FIG. 5, the ferrules are made by extruding a tube 36 while forming a plurality of circumferentially spaced, longitudinal ribs 16 along the inside surface 14 of the tube. The outside of the tube may be cylindrical as shown or have any desired extrudable shape. Any of the extrudable high modulus materials may be used such as steel, aluminum, magnesium, brass and plastic. The tube is then cut into desired lengths L to define a plurality of ferrules. The cutting may be accomplished in any known manner such as by turning, sawing or shearing. A turning operation allows the economic forming of an internal chamfer on one or both ends of the ferrule at minimum cost. The turning operation also allows beveling end portions of the ribs as an extension of the internal chamfer should it be desired. Similarly, circumferentially spaced teeth may be formed from the ribs by machining the transverse groove 30 to define the internal serrated collar.

In service, the ferrule is used with a male stem 38 having a locking collar 40 and optionally, a serrated stem 41 for coupling a hose 42 having a tube 44, twined reinforcement 46 and cover 48 as shown in FIGS. 6, 7 and 9. The locking collar is used when the service applications require high pressure operation. In lower hose pressure applications, the teeth may not be so formed and the locking collar need not be used. The ferrule may be prepositioned on and attached to the male stem by crimping around the ferrule attaching collar. This positions the ferrule substantially concentric with the stem to define an annular hose-end cavity. The crimping extrudes portions of the ribs around the locking collar to define the teeth 34.

Optionally, but preferably, the ferrule is not preattached to the stem, but rather it is inserted over the hose end and the stem is inserted in the hose bore as shown in FIG. 6. The ferrule is crimped against the locking collar which forms the locking teeth 34, behind the collar 40 as shown in FIGS. 7 and 8. When sharp ribs are used, they cut through the hose cover and make surface contact with the reinforcement. A wire reinforcement will partially embed 50 into the ribs. The ribs should be from about 33 percent to about 75 percent of the thickness of the hose cover to cut through the cover and contact the reinforcement. The ribs contact the reinforcement pushing it radially inward which displaces portions of the cover and tube to make the reinforcement assume a polygonal shape 52 as shown in FIG. 9. This forces the tube in tight relationship with the stem to effect a seal therewith. The teeth 34 hold the ferrule to the collar 40 while the ribs 16 grip the reinforcement 46 securing the hose 42 to the ferrule 10.

The foregoing procedure was described for a "noskive" operation. If desired, the cover may be removed to expose the reinforcement so that the ribs do not have to cut through the cover. The rib height and shape may have to be changed.

When a textile reinforced hose is used, the ribs as shown in the ferrule of FIG. 4 are preferred since contact with the reinforcement is probably to be avoided. The sector-shaped ribs displace the cover tube and reinforcement to effectively retain the stem.

To illustrate; a satisfactory ferrule for use with SAE 100R1 wire braid hose is designed to operate at 2,000 psi working pressure and have an 8,000 psi burst with a minimum 150,000 cycle life, the following ferrule was used:

Sleeve I.D., mm: 24.1
Sleeve O.D., mm: 27.9
Rib Height, mm: 2.0
Crimp O.D., mm: 23.9

The ferrule was used with a prior art serrated stem and exhibited satisfactory performance.

The foregoing detailed description is made for purpose of illustration only and is not intended to limit the scope of the invention which is to be determined from the appended claims.

What is claimed is:

1. A ferrule for use in coupling hose having a wire reinforcement between a tube and cover comprising:
   a sleeve having length, an inside surface, and axis, and ends;
   a plurality of circumferentially spaced ribs extended longitudinally a major length of the sleeve and substantially radially inwardly from the sleeve inside surface, the ribs generally axially oriented with the sleeve axis and having longitudinally extending surface portions that define sufficiently sharp means for cutting through the hose cover and being partially embedded by portions of the wire reinforcement to grip the wire reinforcement and secure the hose to the ferrule; and
   a plurality of circumferentially spaced teeth at one sleeve end where each tooth is formed as a portion of one of said ribs.

2. A ferrule for use in coupling hose having a wire reinforcement between a tube and cover comprising:
   a sleeve having length, an inside surface, an axis, and ends and;
   a plurality of circumferentially spaced ribs extended longitudinally a major length of the sleeve and substantially radially inwardly from the sleeve inside surface, the ribs generally axially oriented with the sleeve axis and having longitudinally extending surface portions that define sufficiently sharp means for cutting through the hose cover and being partially embedded by portions of the wire reinforcement to grip the wire reinforcement and secure the hose to the ferrule, and
   wherein each rib has a transverse groove near one sleeve end and wherein the rib grooves are annularly aligned with each other in relation to the sleeve axis.

3. A hose assembly of the type having a hose with a tube, twined wire reinforcement and cover; and couplings attached to the hose ends that each have a male stem with a ferrule locking collar, and a ferrule positioned substantially concentric with the stem and having an inside surface wherein the improvement comprises:
 a plurality of circumferentially spaced ribs, projecting from the inside surface of the ferrule substantially radially inwardly and oriented substantially longitudinally in relation with the ferrule, the ribs having longitudinally extending surface portions that are partially embedded by and are in longitudinal contact with portions of the wire reinforcement whereby the ribs grip the wire reinforcement and secure the hose to the ferrule; and
 means for attaching the ferrule to the stem locking collar comprising a plurality of circumferentially spaced teeth projecting from the inside surface of the ferrule and extending behind the locking collar.

4. A method for making a ferrule for a hose coupling comprising the steps of:
 extruding a tube and forming a plurality of circumferentially spaced, longitudinal ribs that extend substantially radially inwardly along the inside surface of the tube while simultaneously forming longitudinal extending surface portions on the ribs that define sufficiently sharp means for cutting through a hose cover and being partially embedded by portions of a wire reinforcement of a hose;
 cutting the tube into desired lengths to define ferrules; and forming an internal chamfer on one end of the ferrule at a desired conical angle; and
 beveling end portions of the ribs as an extension of the internal chamfer.

5. A method for making a ferrule for coupling a hose of the type with a wire reinforcement between a tube and cover comprising the steps of:
 extruding a tube of desired length and forming a plurality of circumferentially spaced, longitudinal ribs that extend longitudinally the length of the tube substantially radially inwardly along the inside surface of the tube while simultaneously forming longitudinal extending surface portions on the ribs that define sufficiently sharp means for cutting through the hose cover being partially embedded by portions of a wire reinforcement of a hose;
 cutting the tube into desired lengths to define ferrules having first and second ends; and
 forming a plurality of circumferentially spaced teeth from the ribs at one of said ends of the ferrule to define an internal, serrated collar while retaining a major length of the ribs.

6. A method for making a ferrule for a hose coupling comprising the steps of:
 extruding a tube and forming a plurality of circumferentially spaced, longitudinal ribs that extend substantially radially inwardly along the inside surface of the tube while simultaneously forming longitudinal extending surface portions on the ribs that define means for being partially embedded by portions of a wire reinforcement of a hose;
 cutting the tube into desired lengths to define ferrules having first and second ends; and
 crimping the ferrule while simultaneously forming a plurality of circumferentially spaced teeth from the ribs at one of said ends.

7. In a ferrule for use with a male stem having a collar, the ferrule of the type with an end portion that is reducible to a smaller diameter, such as by swaging or crimping, to engage and attach to the stem collar at an inside surface of the ferrule, the improvement comprising:
 means for attaching the ferrule to the stem collar comprising a plurality of longitudinally oriented ribs longitudinally extending and projecting from the inside surface at the attachable end portion of the ferrule, the ribs deformable against the stem collar to define a transverse groove in each rib leaving teeth formed of the ribs to extend behind the stem collar to attach the ferrule to the male stem when the ferrule is reduced to the smaller diameter.

8. A coupling for use with hose and of the type having a male stem with a collar, and a ferrule positioned substantially concentric with the stem and having an end portion reduced to a smaller diameter, such as by swaging or crimping, to engage and attach to the stem collar at an inside surface of the ferrule, the stem and ferrule defining an annular hose-end receiving cavity, wherein the improvement comprises:
 a plurality of longitudinally oriented ribs longitudinally extending and projecting from the inside surface at the attachable end portion of the ferrule where they are deformed against the stem collar to define teeth formed of the ribs that extend behind the collar and attach the ferrule to the male stem when the ferrule is reduced to the smaller diameter.

* * * * *